US012783126B2

(12) United States Patent
Tian et al.

(10) Patent No.: US 12,783,126 B2
(45) Date of Patent: Nov. 3, 2026

(54) STORAGE SYSTEM, CREATION METHOD, DATA PROCESSING METHOD, APPARATUS AND DEVICE, AND NONVOLATILE READABLE STORAGE MEDIUM

(71) Applicant: IEIT SYSTEMS CO., LTD., Jinan (CN)

(72) Inventors: Zhiyong Tian, Jinan (CN); Bin Sun, Jinan (CN)

(73) Assignee: IEIT SYSTEMS CO., LTD., Jinan (CN)

( * ) Notice: Subject to any disclaimer, the term of this patent is extended or adjusted under 35 U.S.C. 154(b) by 0 days.

(21) Appl. No.: 19/156,097

(22) PCT Filed: Dec. 26, 2023

(86) PCT No.: PCT/CN2023/141948
§ 371 (c)(1),
(2) Date: Aug. 13, 2025

(87) PCT Pub. No.: WO2024/179157
PCT Pub. Date: Sep. 6, 2024

(65) Prior Publication Data

US 2026/0119040 A1 Apr. 30, 2026

(30) Foreign Application Priority Data

Feb. 27, 2023 (CN) ......................... 202310166827.9

(51) Int. Cl.
*G06F 12/00* (2006.01)
*G06F 3/06* (2006.01)

(52) U.S. Cl.
CPC .......... *G06F 3/0611* (2013.01); *G06F 3/0659* (2013.01); *G06F 3/0679* (2013.01)

(58) Field of Classification Search
CPC ..... G06F 3/0611; G06F 3/0659; G06F 3/0679
See application file for complete search history.

(56) References Cited

U.S. PATENT DOCUMENTS 6,324,627 B1 * 11/2001 Kricheff ................ G06F 3/0637 711/163
8,914,557 B2 * 12/2014 Fortin ................. G06F 12/0808 710/29

(Continued)

FOREIGN PATENT DOCUMENTS

CN 105446899 A 3/2016
CN 107967124 A 4/2018

(Continued)

OTHER PUBLICATIONS

Dejiao Niu, et al. "The new solid storage system with asymmetric interface." Journal of Computer Research and Development. 55(9): 2083-2093. 2018.

*Primary Examiner* — Shawn X Gu
*Assistant Examiner* — Mohammad S Hasan
(74) *Attorney, Agent, or Firm* — IPro, PLLC

(57) ABSTRACT

The present application discloses a storage system, a creation method, a data processing method, apparatus and device, and a non-volatile readable storage medium, and relates to the technical field of storage. The storage system comprises a first storage space used for processing read-write requests not aligned with block sizes, the first storage space specifically being a storage space containing persistent memory regions of a plurality of storage devices, a second storage space that is connected to the first storage space and is used for processing read-write requests aligned with a first block size, and a third storage space that is connected to the second storage space and is used for processing read-write requests aligned with a second block size, the second block size being greater than the first block size. According to the present application, small I/O read-write performance is improved, while a storage system having high reliability and high cost performance is achieved.

15 Claims, 8 Drawing Sheets

(56) References Cited

U.S. PATENT DOCUMENTS

| | | | | |
|---|---|---|---|---|
| 2013/0117503 | A1* | 5/2013 | Nellans | G06F 12/0246 711/103 |
| 2019/0347125 | A1 | 11/2019 | Sankaran et al. | |
| 2020/0401530 | A1* | 12/2020 | Abulila | G06F 12/124 |
| 2021/0073092 | A1* | 3/2021 | Yin | G06F 3/067 |

FOREIGN PATENT DOCUMENTS

| | | | | | |
|---|---|---|---|---|---|
| CN | 109558457 | A | | 4/2019 | |
| CN | 112992207 | A | | 6/2021 | |
| CN | 113485635 | A | | 10/2021 | |
| CN | 113778906 | A | * | 12/2021 | G06F 12/0246 |
| CN | 114968855 | A | | 8/2022 | |
| CN | 115437581 | A | | 12/2022 | |
| CN | 115482876 | A | | 12/2022 | |
| CN | 110018987 | B | * | 3/2023 | G06F 16/128 |
| CN | 115951841 | A | | 4/2023 | |
| WO | 2022213736 | A1 | | 10/2022 | |

* cited by examiner

STORAGE SYSTEM, CREATION METHOD, DATA PROCESSING METHOD, APPARATUS AND DEVICE, AND NONVOLATILE READABLE STORAGE MEDIUM

CROSS-REFERENCE TO RELATED APPLICATION

The present disclosure claims the priority of the Chinese Patent application filed on Feb. 27, 2023 before the CNIPA, China National Intellectual Property Administration with the application number of 2023101668279, and the title of "STORAGE SYSTEM AND CREATION METHOD, DATA PROCESSING METHOD AND APPARATUS, DEVICE, AND MEDIUM", which is incorporated herein in its entirety by reference.

FIELD

The present disclosure relates to the field of storage technologies, and particularly, to a storage system and a creation method, a data processing method and apparatus, a device, and a non-volatile readable storage medium.

BACKGROUND

Evolution of storage system software is closely related to storage media and applications. When the storage media and application scenarios change, storage software needs to be redesigned. Different media have different characteristics. Storage systems need to leverage the strengths and mitigate the weaknesses of different media to achieve optimal balance among performance, price, and reliability.

A hard disk drive (HDD) has a large capacity and a low price, but performance of the HDD lags significantly compared with a solid-state drive (SSD), so the HDD is gradually being phased out. For a single level cell (SLC), a multi level cell (MLC) and a quad level cell (QLC), in terms of reliability, the SLC> the MLC> the QLC; and in terms of price, the SLC> the MLC> the QLC. Moreover, the price of the QLC is expected to be lower than or equal to that of the HDD, thus, using any type of flash memory used alone has inherent drawbacks.

A first generation of storage system software is mainly to optimize the HDD, which has a heavy storage stack and high latency and cannot to fully utilize the performance of the SSD; and a current storage system optimized for a flash memory generally uses a single type of flash memory, for example, the MLC or a triple level cell (TLC), which has high performance, low cost-performance ratio, and limited applicable scenarios.

In a related technology, all read/write operations are performed in units of blocks. As shown in FIG. 1, in a reading and writing process of a small input/output (IO), a to-be-modified block needs to be read out first, then part of data in the block is modified, and finally, the modified data is written down, that is, leading to a read-modify-write process. Therefore, as the number of IO operations increases, the volume of data read and written will also increase, which is also a main reason for low read and write performance of the small IO.

Therefore, how to improve the read and write performance of the small IO, and simultaneously implement a high-reliability and high-cost performance storage system is a technical problem to be solved by a person skilled in the art.

SUMMARY

The present application aims to provide a storage system and a creation method, a data processing method and apparatus, a device, and a non-volatile readable storage medium, which improves read and write performance of a small input/output, and simultaneously implement a high-reliability and high-cost performance storage system.

To achieve the foregoing object, the present application provides a storage system, including:

- a first storage space, configured to process a non-block size aligned read/write request, wherein the first storage space is specifically a storage space including persistent memory regions of a plurality of storage devices;
- a second storage space connected to the first storage space, configured to process a first block size aligned read/write request; and
- a third storage space connected to the second storage space, configured to process a second block size aligned read/write request, wherein the second block size is greater than the first block size.

Wherein, the first storage space is specifically a storage space of a storage-class memory.

Wherein, the storage device is specifically a solid-state drive.

Wherein, the first storage space is specifically a contiguous linear storage space includes persistent memory regions of the plurality of storage devices.

Wherein, the first storage space is further configured to aggregate data of a plurality of bytes into data of the first block size and migrate the data to the second storage space.

Wherein, the second storage space is further configured to aggregate a plurality of pieces of data of the first block size into data of the second block size and migrate the data to the third storage space.

Wherein, the second storage space is specifically a single level cell or a multi level cell.

Wherein, the third storage space is specifically a triple level cell, or a quad level cell, or a penta level cell.

Wherein, the first storage space is specifically configured to store byte-scale data;

- the second storage space is specifically configured to store KB-scale data; and
- the third storage space is specifically configured to store MB-scale data.

Wherein, the first storage space is specifically a contiguous storage space includes persistent memory regions of a plurality of storage devices, the persistent memory regions are storage regions created by using a persistent memory region function of the storage device, and the first storage space, the second storage space, and the third storage space are implemented on different flash memories.

To achieve the foregoing object, the present application provides a creation method for a storage system, including:

- respectively mapping persistent memory regions of a plurality of storage devices to a memory address space of an operating system, to create a first storage space configured to process a non-block size aligned read/write request;
- creating a second storage space configured to process a first block size aligned read/write request; and
- creating a third storage space configured to process a second block size aligned read/write request, wherein the second block size is greater than the first block size.

Wherein the creating a first storage space configured to process a non-block size aligned read/write request includes:

concatenating the plurality of persistent memory regions into a contiguous linear storage space based on a memory logical address after the plurality of persistent memory regions are mapped, and using the contiguous linear storage space as the first storage space configured to process the non-block size aligned read/write request.

Wherein the creating a second storage space configured to process a first block size aligned read/write request includes:

creating a single level cell or a multi level cell configured to process the read/write request that is aligned with the first block size.

Wherein the creating a third storage space configured to process a second block size aligned read/write request includes:

creating a triple level cell, or a quad level cell, or a penta level cell configured to process the read/write request that is aligned with the second block size.

Wherein the storage system is an all-flash storage system, the persistent memory regions are storage regions created by using a persistent memory region function of the storage device, and the first storage space, the second storage space, and the third storage space are implemented on different flash memories.

To achieve the foregoing object, the present application provides a creation apparatus for a storage system, including:

a first creation module, configured to respectively map persistent memory regions of a plurality of storage devices to a memory address space of an operating system, to create a first storage space configured to process a non-block size aligned read/write request;

a second creation module, configured to create a second storage space configured to process a first block size aligned read/write request; and a third creation module, configured to create a third storage space configured to process a second block size aligned read/write request, wherein the second block size is greater than the first block size.

A first creation module is specifically configured to: respectively map persistent memory regions of a plurality of storage devices to a memory address space of an operating system, concatenate a plurality of persistent memory regions into a contiguous linear storage space based on a memory logical address after the plurality of persistent memory regions are mapped, and use the contiguous linear storage space as the first storage space configured to process the non-block size aligned read/write request.

A second creation module is specifically configured to create a single level cell or a multi level cell configured to process the first block size aligned read/write request.

A third creation module is specifically configured to create a triple level cell or a quad level cell configured to process the second block size aligned read/write request.

To achieve the foregoing object, the present application provides a data processing method, including:

determining an alignment mode of the read/write request when receiving a read/write request;

responding to the read/write request by using a first storage space of a storage system in a case that the read/write request is non-block size aligned, wherein the storage system is specifically the storage system according to any one of claims 1 to 10;

responding to the read/write request by using a second storage space of the storage system in a case that the read/write request is aligned with a first block size; and responding to the read/write request by using a third storage space of the storage system in a case that the read/write request is aligned with a second block size, wherein the second block size is greater than the first block size.

Wherein, the data processing method further includes:

aggregating data of a plurality of bytes in the first storage space into data of the first block size and migrating the data to the second storage space.

Wherein the data processing method further includes:

aggregating a plurality of pieces of data of the first block size in the second storage space into data of the second block size and migrating the data to the third storage space.

Wherein the storage system is an all-flash storage system, the first storage space is specifically a contiguous storage space includes persistent memory regions of a plurality of storage devices, the persistent memory regions are storage regions created by using a persistent memory region function of the storage device, and the first storage space, the second storage space, and the third storage space are implemented on different flash memories.

To achieve the foregoing object, the present application provides a data processing apparatus, including:

a determination module, configured to determine an alignment mode of the read/write request when receiving a read/write request;

a first storage module, configured to respond to the read/write request by using a first storage space of a storage system in a case that the read/write request is non-block size aligned read/write request, wherein the storage system is specifically the storage system according to any one of claims 1 to 10;

a second storage module, configured to respond to the read/write request by using a second storage space of the storage system in a case that the read/write request is a first block size aligned read/write request; and a third storage module, configured to respond to the read/write request by using a third storage space of the storage system in a case that the read/write request is a second block size aligned read/write request, wherein the second block size is greater than the first block size.

The apparatus further includes:

a first migration module, configured to aggregate data of a plurality of bytes in the first storage space to data of the first block size and migrate the data to second storage space.

The apparatus further includes:

a second migration module, configured to aggregate a plurality of pieces of data of the first block size in the second storage space into data of the second block size and migrate the data to the third storage space.

To achieve the foregoing object, the present application provides an electronic device, including:

a memory, configured to store a computer program; and a processor, configured to implement, when executing the computer program, steps of the creation method for a storage system or the data processing method.

To achieve the foregoing object, the present application provides a non-volatile readable storage medium, wherein the non-volatile readable storage medium has a computer program stored therein, and the computer program implements, when executed by a processor, steps of the creation method for a storage system or the data processing method.

It may be learned from the above solution that the storage system according to the present application includes a first storage space, configured to process a non-block size aligned read/write request, wherein the first storage space may be a storage space including persistent memory regions of a plurality of storage devices; a second storage space connected to the first storage space, configured to process a first block size aligned read/write request; and a third storage space connected to the second storage space, configured to process a second block size aligned read/write request, wherein the second block size is greater than the first block size.

According to the storage system provided in the present application, different storage spaces process different input/output types of data according to characteristics of different flash memories, so as to establish a high-performance, high-cost performance, and high-reliability all-flash storage system. In addition, according to the storage system provided in the present application, the persistent memory regions in the plurality of storage devices are aggregated into the first storage space for use, which eliminates a read-modify-write process, and improves read and write performance of a small input/output. The present application further discloses a storage system and a creation method, a data processing method and apparatus, a device, and a non-volatile readable storage medium, which can also achieve the foregoing technical effects.

It is to be understood that the above general descriptions and the following detailed descriptions are only exemplary, and cannot limit the present application.

BRIEF DESCRIPTION OF THE DRAWINGS

To better illustrate the technical solutions in the embodiments of this application or the related technology, the drawings used in the descriptions of the embodiments or related technology will be briefly introduced. It should be clear that the drawings described below are only some embodiments of this application. On the basis of these drawings, persons of ordinary skill in the field can obtain other drawings without expending creative effort. The drawings are intended to provide an understanding of this disclosure and form a part of the specification. Together with the embodiments described below, they are used to explain this disclosure, but are not intended to limit it. In the drawings.

DETAILED DESCRIPTION

The technical solutions in the embodiments of this application will be clearly and comprehensively described with reference to the drawings in the embodiments. Note that the embodiments described are only part of this application, not all of them. Any other embodiments derived by persons of ordinary skill in the field based on the embodiments here, without creative effort, are within the scope of this application. Also, terms like "first" and "second" in the embodiments are used to distinguish similar objects, not to indicate a specific order.

The non-volatile memory express (NVMe) 1.4 specification introduces an important feature: the Persistent Memory Region (PMR). A PMR is a storage area created and managed using this functionality. It can be mapped to the PCI Express bus address space, allowing access by the host and other devices. A key characteristic of the PMR is that data remains intact even after power loss, controller reset, or PMR enable/disable operations. In essence, this feature enables SSDs to provide an additional non-volatile storage area alongside the standard storage accessed via logical block addresses (LBAs). Unlike traditional block-based access, PMR uses a memory-access model, eliminating the inefficient read-modify-write process. It offers faster access speeds than traditional flash memory, approaching the performance of system memory. Moreover, it ensures data isn't lost when the SSD fails, making it a viable alternative to non-volatile memory. PMRs typically have small capacity, high speed, high reliability, and a high price, making them suitable for small-scale byte-level I/O operations.

SLC (single-level cell) and MLC (multi-level cell) flash memories offer high reliability but at a higher cost. They read and write data in block units and perform best when processing entire blocks. They are suitable for block-aligned data (measured in KB).

TLC (triple-level cell), QLC (quad-level cell), and PLC (penta-level cell) flash memories are more cost-effective but have a shorter lifespan. They represent the majority of system storage capacity and are a key factor in determining overall cost. Their aggregate bandwidth is increased and failure rate reduced using technologies like Erasure Coding (EC). Global wear-leveling technology improves their cost-performance ratio. They are suitable for processing large-block data (measured in MB).

The present application leverages all aforementioned storage media types. It aggregates multiple NVMe SSDs with PMR functionality and integrates their PMR memory spaces into a unified linear space. This achieves high IOPS (Input/Output Operations Per Second) and efficiently handles byte-scale hot data. Block-aligned I/O is stored on SLC or MLC flash, which serves as the physical foundation for high-bandwidth storage of warm data. Meanwhile, TLC, QLC, or PLC flash is suitable for large-I/O read/write operations and mainly stores cold data.

Figure 1:
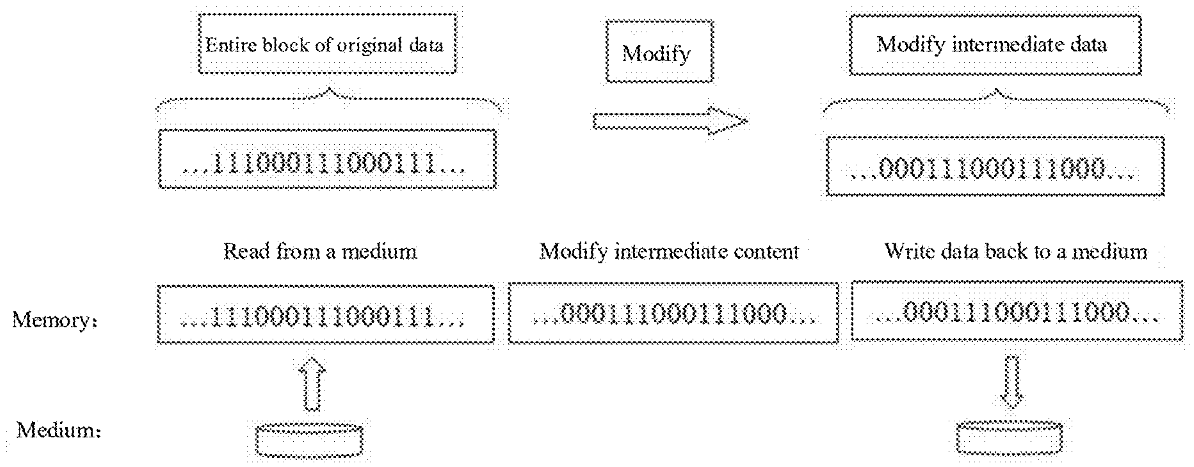
FIG. 1 is a schematic diagram of a data read-modify-write process for block-based data in a related technology.
Figure 2:
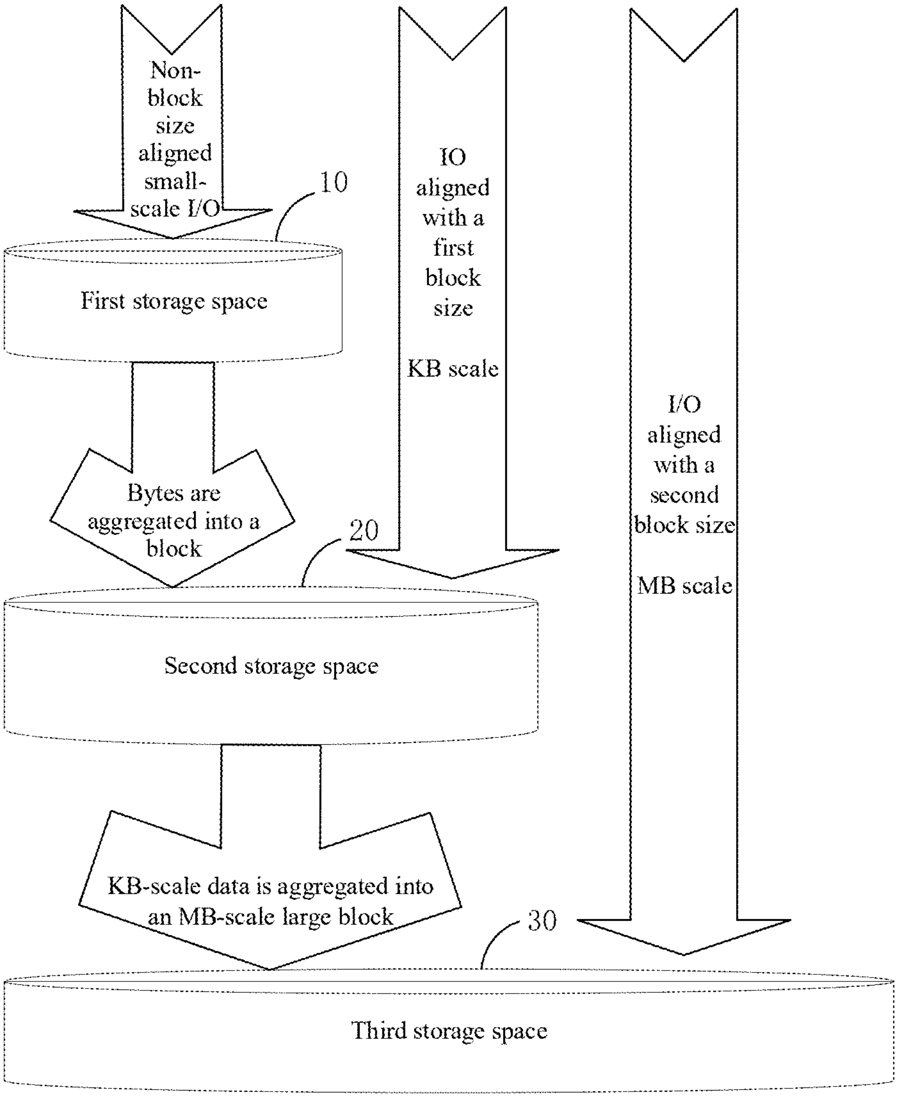
FIG. 2 is a structural diagram of a storage system according to an exemplary embodiment.

An embodiment of the present application discloses a storage system, referring to FIG. 2. A structural diagram of a storage system according to an exemplary embodiment is shown in FIG. 2. The storage system includes:

- a first storage space 10, configured to process a non-block size aligned read/write request, wherein the first storage space may be a storage space including PMRs of a plurality of storage devices;
- a second storage space 20 connected to the first storage space 10, configured to process a first block size aligned read/write request; and
- a third storage space 30 connected to the second storage space 20, configured to process a second block size aligned read/write request, wherein the second block size is greater than the first block size.

In this embodiment, to fully utilize characteristics of all flash memories, an entire storage system is divided into three tiers, that is, the first storage space 10, the second storage space 20, and the third storage space 30.

The first storage space 10 mainly solves a problem about performance of a small-scale I/O, and a main function of the first storage space 10 is to process an I/O that is smaller than a block or a non-block size aligned I/O, thereby avoiding inefficient read-modify-write operations. Because the first storage space is non-volatile, it allows immediate operation return upon write completion of a user. That is, the first storage space 10 may be configured to store byte-scale data. The first storage space 10 may be a storage space of a storage-class memory (SCM), and includes PMRs of a plurality of storage devices. The storage device herein may be a solid-state drive (SSD). It is to be noted that, memory logical addresses of the PMRs of various storage devices may be discontiguous, which is inconvenient to use. Therefore, the PMRs are concatenated into a contiguous PMR linear space, that is, the first storage space 10 may be a contiguous linear storage space including PMRs of the plurality of storage devices.

Optionally, the first storage space 10 is further configured to: aggregate data of a plurality of bytes into data of the first block size and migrate the data to the second storage space 20. In an optional implementation, the first storage space will aggregate small blocks of I/O into an entire block, and then migrate data to a next tier, that is, the second storage space.

The second storage space 20 mainly solves a problem about performance of an entire block of I/O. If data of a user is aligned with the first block size, the data will bypass the first storage space and is directly written to the second storage space, that is, the second storage space 20 may be configured to store KB-scale data. The second storage space has characteristics of long service life and high performance, and may be an SLC or an MLC.

Optionally, the second storage space also accepts migration data from the first storage space to avoid running out of space in the first storage space. In addition, the second storage space 20 is further configured to: aggregate a plurality of pieces of data of the first block size into data of the second block size and migrate the data to the third storage space. In an optional implementation, the second storage space will aggregate a certain number of data blocks into a large block, and then migrate the data to a next tier, that is, the third storage space.

The third storage space 30 occupies main costs and has the largest capacity in the entire storage system, that is, the third storage space 30 may be configured to store MB-scale data. The third storage space has poorer performance compared with the first storage space and the second storage space, has a large capacity and low costs, and may be a TLC, or a QLC, or a PLC. If the data of the user is aligned with a large block size, that is, is aligned with a second block size, the data will bypass the first storage space and the second storage space, and is directly written to the third storage space.

Optionally, the third storage space also accepts migration data from the second storage space to avoid running out of space in the second storage space. The third storage space mainly solves a problem about costs, so a related erasure code (EC) technology and a delete compression function will be used at this tier.

According to the storage system provided in the present application, different storage spaces process different I/O types of data according to characteristics of different flash memories, so as to establish a high-performance, high-cost performance, and high-reliability all-flash storage system. In addition, according to the storage system provided in the present application, the PMRs in the plurality of storage devices are aggregated into the first storage space for use, which eliminates a read-modify-write process, and improves read and write performance of a small I/O.

Figure 3:
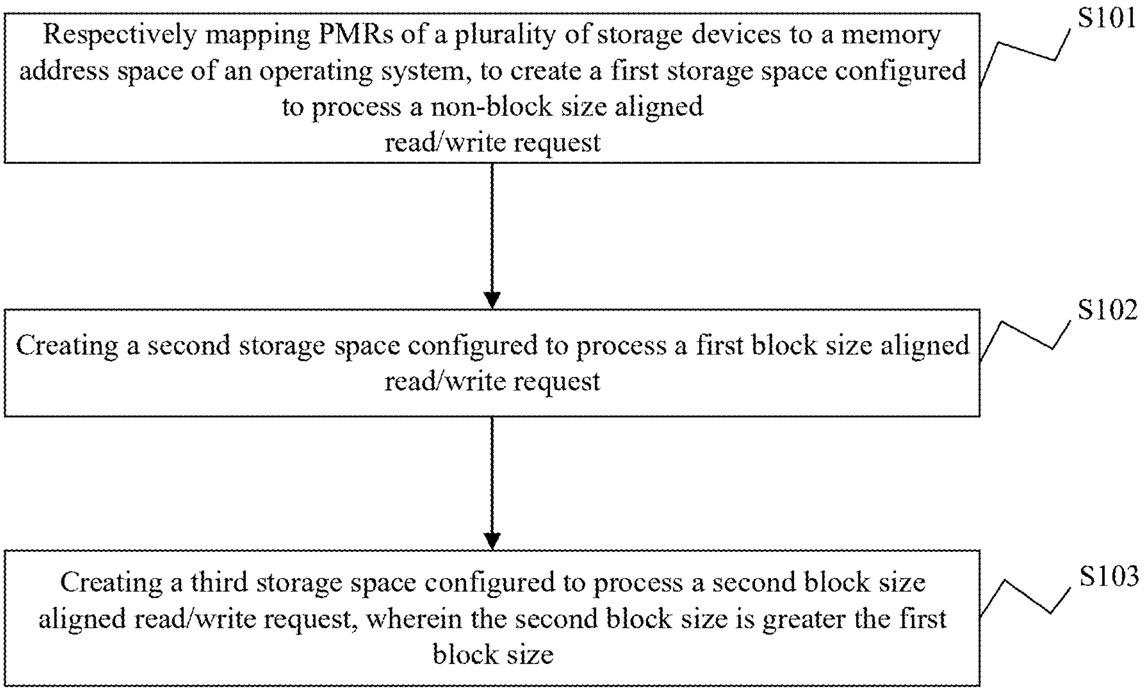
FIG. 3 is a flowchart of a creation method for a storage system according to an exemplary embodiment.

An embodiment of the present application discloses a creation method for a storage system, referring to FIG. 3. A flowchart of a creation method for a storage system according to an exemplary embodiment is shown in FIG. 3. The creation method includes:

S101, respectively mapping PMRs of a plurality of storage devices to a memory address space of an operating system, to create a first storage space configured to process a non-block size aligned read/write request.

It may be understood that both an HDD and an SDD perform read or write operations in blocks with fixed sizes (512 byte or 4 KB), which is a fundamental reason why they are inefficient when processing a byte-scale I/O. A fundamental method for solving this problem is that a physical medium capable of byte-addressable access is required. An important feature, a PMR, is added to an NVMe 1.4. In a PMR memory of the SSD with the feature, data before or after a failure is the same, and data is not lost, effectively making the PMR memory non-volatile.

A PMR memory space of a single NVME SSD is limited. To efficiently utilize the PMR memory of all NVME SSDs, the NVME SSDs need to be aggregated to provide a unified linear space, and a multi replica technology is used to ensure reliability of the unified linear space.

In an optional implementation, first the PMR memory in each storage device (which may be an NVME SSD) is mapped to a memory address space of an operating system, to create a first storage space configured to process a non-block size aligned read/write request.

As an optional implementation, the creating a first storage space configured to process a non-block size aligned read/write request includes: concatenating the plurality of PMRs into a contiguous linear space based on a memory logical address after the plurality of PMRs are mapped, and using the contiguous linear storage space as the first storage space configured to process the non-block size aligned read/write request.

Figure 4:
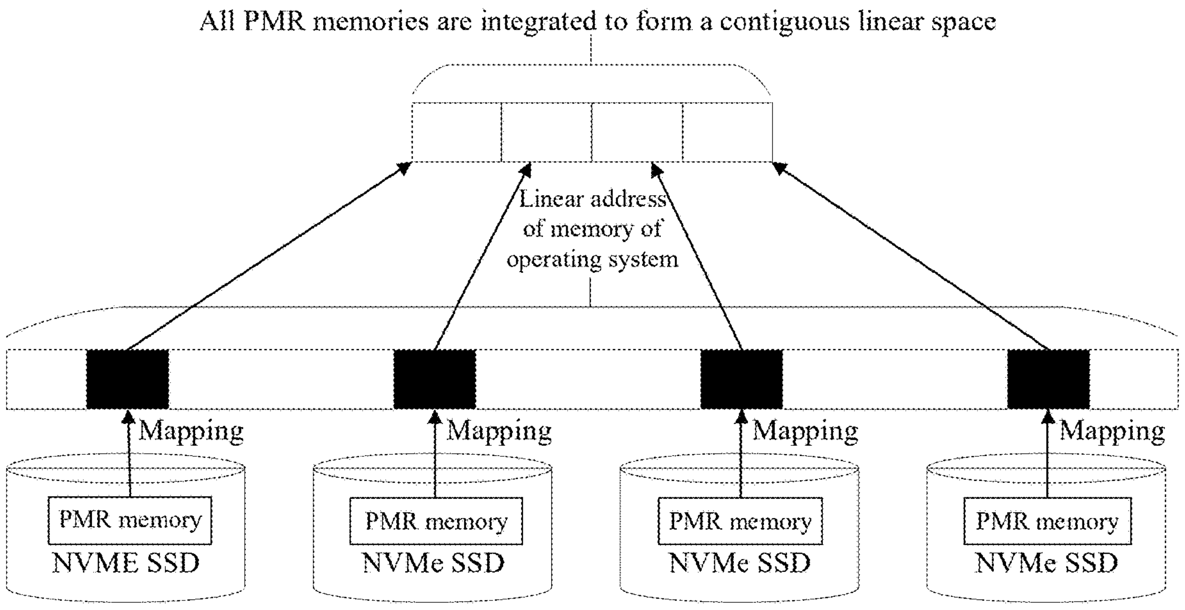
FIG. 4 is a schematic diagram of a linear space integrated with a plurality of persistent memory regions (PMRs) according to an exemplary embodiment.

It may be understood that, after mapping is completed, the memory logical addresses of the PMRs may be discontiguous, which is inconvenient to use. Therefore, it is necessary to concatenate all mapped address spaces into a contiguous PMR linear space, so as to facilitate usage. A schematic diagram of the linear space integrated with a plurality of PMRs is shown in FIG. 4.

Optionally, to prevent physical damage of a single NVME SSD, replicas will be used to ensure data reliability, that is, when a piece of data is written to a PMR linear space, the data will be written to the PMR memory of one or more NVME SSDs. In this way, when one of the NVME SSDs is physically damaged, the data will not be lost.

S102, creating a second storage space configured to process a first block size aligned read/write request.

In an optional implementation, the second storage space configured to process the first block size aligned read/write request is created. The second storage space mainly solves a problem about performance of an entire block of I/O. If the data of the user is aligned with the first block size, the data will bypass the first storage space and is directly written to the second storage space, that is, the second storage space may be configured to store KB-scale data.

As a feasible implementation, the creating a second storage space configured to process a first block size aligned read/write request includes: creating an SLC or an MLC configured to process the first block size aligned read/write request. The second storage space has characteristics of long service life and high performance, and may be an SLC or an MLC.

Optionally, the second storage space also accepts migration data from the first storage space to avoid running out of space in the first storage space. In addition, the second storage space will aggregate a certain number of data blocks into a large block, and then migrate the data to a next tier, that is, the third storage space.

S103, creating a third storage space configured to process a second block size aligned read/write request, wherein the second block size is greater a first block size.

In an optional implementation, the third storage space configured to process the second block size aligned read/write request is created. The third storage space occupies main costs and has the largest capacity in the entire storage system, that is, the third storage space may be configured to store MB-scale data. If the data of the user is aligned with a large block size, that is, aligned with the second block size, the data will bypass the first storage space and the second storage space, and is directly written to the third storage space.

As a feasible implementation, the creating a third storage space configured to process a second block size aligned read/write request includes: creating a TLC or a QLC configured to process the read/write request that is aligned with the second block size. The third storage space has poorer performance compared with the first storage space and the second storage space, and has a large capacity and low costs. The third storage space may be a TLC, or a QLC, or a PLC.

Optionally, the third storage space also accepts migration data from the second storage space to avoid running out of space in the second storage space. The third storage space mainly solves a problem about costs, so a related erasure code (EC) technology and a delete compression function will be used at this tier.

It may be learned that high performance of the storage system according to this embodiment is reflected in that: a small I/O and a block-misaligned I/O are processed by an SCM, which eliminates a read-modify-write process, and greatly improves performance. Each tier has a clear performance optimization objective, and high performance under various I/O loads may be maintained through implementation of simplification and optimization. High cost performance is reflected in that: from a top tier to a bottom tier, the costs gradually decrease, the random performance gradually decreases, and the service life gradually shortens. High cost performance and high performance can be achieved by combining the tiers properly. High reliability is reflected in that: a first tier uses a PMR linear space, which can ensure reliability while ensuring speed; and a second tier and a third tier use an EC or replica technology, which ensures data reliability across the system.

In this embodiment of the present application, different storage spaces process different I/O types of data according to characteristics of different flash memories, so as to establish a high-performance, high-cost performance, and high-reliability all-flash storage system. In addition, in this embodiment of the present application, the PMRs in the plurality of storage devices are aggregated into the first storage space for use, which eliminates a read-modify-write process, and improves read and write performance of a small I/O.

Figure 5:
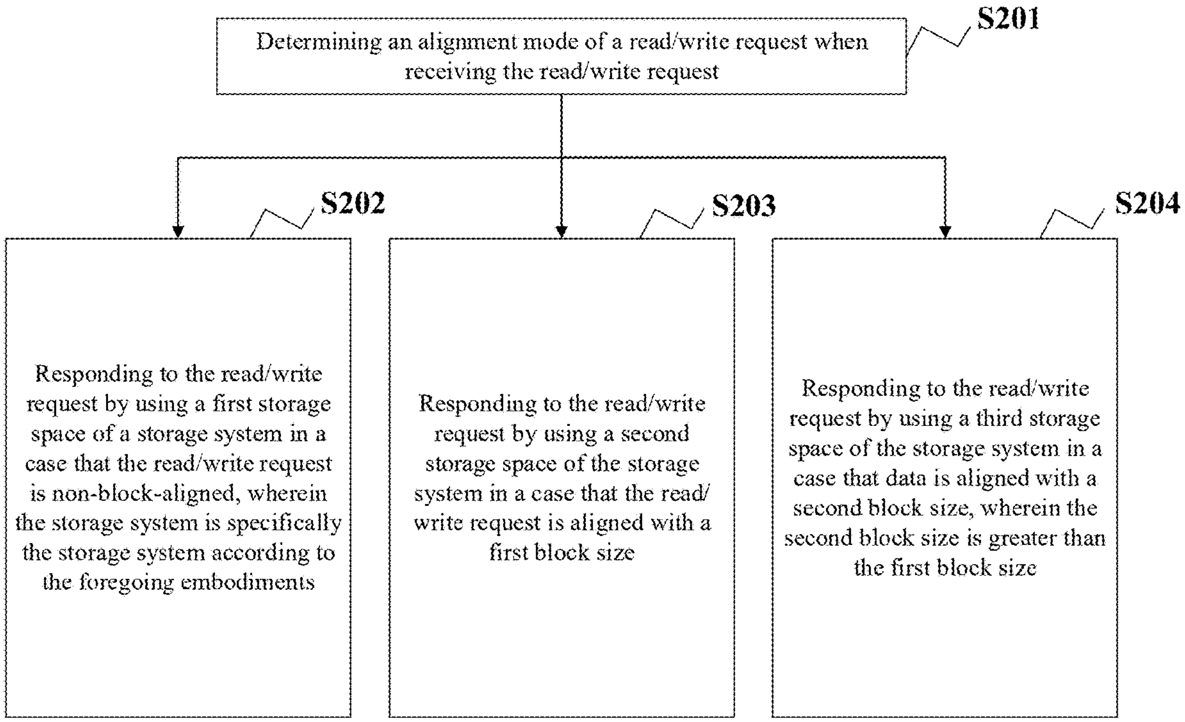
FIG. 5 is a flowchart of a data processing method according to an exemplary embodiment.

An embodiment of the present application discloses a data processing method, referring to FIG. 5. A flowchart of a data processing method according to an exemplary embodiment is shown in FIG. 5. The data processing method includes:

S201, determining an alignment mode of the read/write request when receiving a read/write request.

S202, responding to the read/write request by using a first storage space of a storage system in a case that the read/write request is non-block size aligned read/write request, wherein the storage system may be the storage system according to the foregoing embodiments.

In an optional implementation, if data of a user is smaller than a block or is non-block size aligned, the data is written to the first storage space.

S203, responding to the read/write request by using a second storage space of the storage system in a case that the read/write request is a first block size aligned read/write request.

In an optional implementation, if the data of the user is aligned with a first block size, the data will bypass the first storage space and is directly written to the second storage space.

S204, responding to the read/write request by using a third storage space of the storage system in a case that the data is aligned with a second block size, wherein the second block size is greater than the first block size.

In an optional implementation, if the data of the user is aligned with a large block size, that is, aligned with the second block size, the data will bypass the first storage space and the second storage space, and is directly written to the third storage space.

Based on the foregoing embodiments, as an optional implementation, the method further includes: aggregating data of a plurality of bytes in the first storage space into data of the first block size and migrating the data to the second storage space. In an optional implementation, the first storage space will aggregate small blocks of I/O into an entire block, and then migrate data to a next tier, that is, the second storage space. The second storage space accepts migration data from the first storage space to avoid running out of space in the first storage space.

Based on the foregoing embodiments, as an optional implementation, the method further includes: aggregating a plurality of pieces of data of the first block size in the second storage space into data of the second block size and migrating the data to the third storage space. In an optional implementation, the second storage space will aggregate a certain number of data blocks into a large block, and then migrate the data to the third storage space. The third storage space accepts migration data from the second storage space to avoid running out of space in the second storage space.

In this embodiment of the present application, different storage spaces process different I/O types of data according to characteristics of different flash memories, so as to establish a high-performance, high-cost performance, and high-reliability all-flash storage system. In addition, in this embodiment of the present application, the PMRs in the plurality of storage devices are aggregated into the first storage space for use, which eliminates a read-modify-write process, and improves read and write performance of a small I/O.

An application embodiment according to the present application is introduced below. A PMR memory space of a single NVME SSD is limited. To efficiently utilize the PMR memory of all NVME SSDs, the NVME SSDs need to be aggregated to provide a unified linear space, and a multi replica technology is used to ensure reliability of the unified linear space.

First, the PMR memory of each NVME SSD is mapped to a memory address space of an operating system, and after mapping is completed, the memory logical address of the PMR memory may be discontiguous, which is inconvenient to use. Therefore, it is necessary to concatenate all mapped address spaces into a contiguous PMR linear space, so as to facilitate usage.

To prevent physical damage of a single NVME SSD, replicas will be used to ensure data reliability, that is, when a piece of data is written to a PMR linear space, the data will be written to the PMR memory of one or more NVME SSDs. In this way, when one of the NVME SSDs is physically damaged, the data will not be lost.

Figure 6:
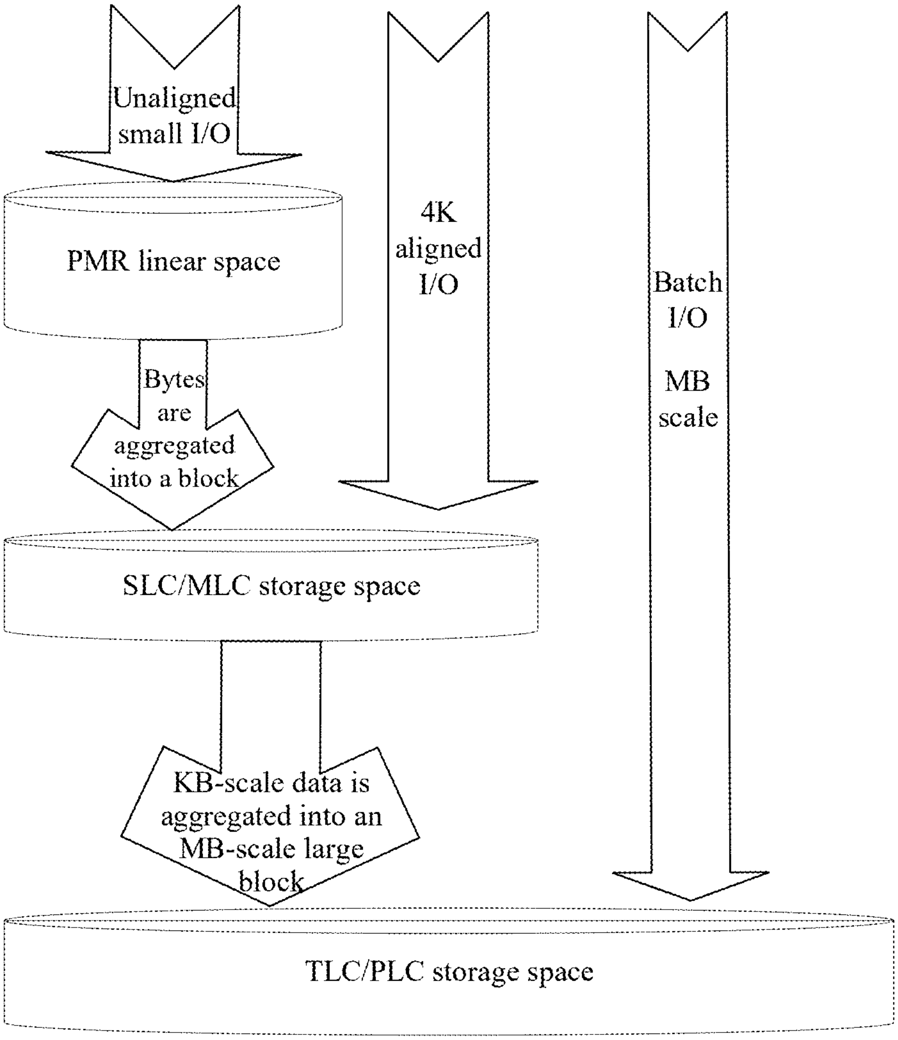
FIG. 6 is a structural diagram of a flash memory in an application embodiment according to the present application.

To fully utilize the characteristics of a current flash memory, as shown in FIG. 6, an entire flash memory structure is divided into three tiers.

A first tier is a PMR linear space. Essentially, the PMR linear space is equivalent to a power bank memory. This tier mainly solves a problem about performance of a small I/O. A main function of the PMR linear space is to process an I/O that is smaller than a block or a non-block size aligned I/O, thereby avoiding inefficient read-modify-write operations. Because the PMR linear space is non-volatile, it allows immediate operation return upon write completion of a user. The PMR linear space will aggregate these small blocks of I/O into an entire block, and then migrate data to a next tier.

A second tier is an SLC/MLC storage space. The tier mainly solves a problem about performance of an entire block of I/O. A current SSD of an SLC/MLC is 4 KB aligned. If the data of the user is 4 KB aligned and a length is an integer multiple of 4 KB, the data will bypass the first tier and is directly written to this tier. This tier also accepts migration data from the PMR linear space to avoid running out of space in the PMR linear space. An SLC/MLC flash memory has a relatively long service life and relatively high performance, and buffering is suitable to be performed at this tier. The SLC/MLC flash memory will aggregate a certain number of 4 KB blocks into a large block (MB scale), and then migrate the data to a next tier.

A third tier is TLC/QLC/PLC storage space. This tier occupies main costs and has the largest capacity in an entire system. This tier has poorer performance compared with the first two tiers, and has a large capacity and low costs. If data of a user is aligned with a large block size, the data will bypass the first two tiers, and is directly written to this tier. This tier also accepts migration data from the SLC/MLC storage space to avoid running out of space in the SLC/MLC storage space. This tier mainly solves a problem about costs, so a related EC technology and a delete compression function will be used at this tier.

High performance of the storage system according to this embodiment is reflected in that: a small I/O and a block-misaligned I/O are processed by an SCM, which eliminates a read-modify-write process, and greatly improves performance. Each tier has a clear performance optimization objective, and high performance under various I/O loads may be maintained through implementation of simplification and optimization. High cost performance is reflected in that: from a top tier to a bottom tier, the costs gradually decrease, the random performance gradually decreases, and the service life gradually shortens. High cost performance and high performance can be achieved by combining the tiers properly. High reliability is reflected in that: a first tier uses a PMR linear space, which can ensure reliability while ensuring speed; and a second tier and a third tier use an EC or replica technology, which ensures data reliability across the system.

A creation apparatus for a storage system according to an embodiment of the present application is introduced below. The creation apparatus for a storage system described below and the creation method for a storage system described above may refer to each other.

Figure 7:
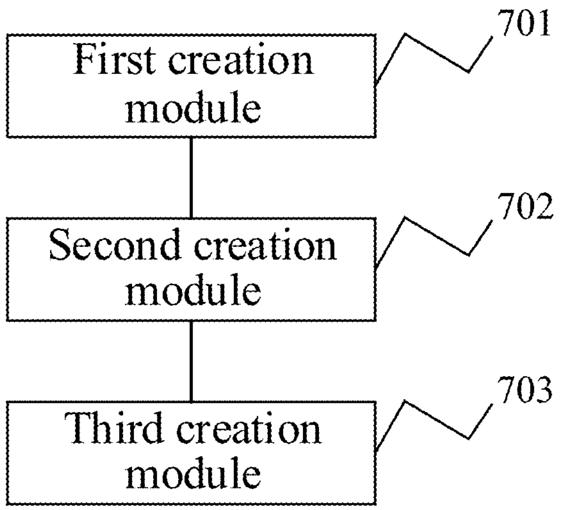
FIG. 7 is a structural diagram of a creation apparatus for a storage system according to an exemplary embodiment.

Refer to FIG. 7, which is a structural diagram of a creation apparatus for a storage system according to an exemplary embodiment. As shown in FIG. 7, the creation apparatus includes:

- a first creation module 701, configured to respectively map PMRs of a plurality of storage devices to a memory address space of an operating system, to create a first storage space configured to process a non-block size aligned read/write request;
- a second creation module 702, configured to create a second storage space configured to process a first block size aligned read/write request; and
- a third creation module 703, configured to create a third storage space configured to process a second block size aligned read/write request, wherein the second block size is greater the first block size.

In this embodiment of the present application, different storage spaces process different I/O types of data according to characteristics of different flash memories, so as to establish a high-performance, high-cost performance, and high-reliability all-flash storage system. In addition, in this embodiment of the present application, the PMRs in the plurality of storage devices are aggregated into the first storage space for use, which eliminates a read-modify-write process, and improves read and write performance of a small I/O.

Based on the foregoing embodiments, as an optional implementation, the first creation module 701 may be configured to: respectively map PMRs of a plurality of storage devices to a memory address space of an operating system, concatenate a plurality of PMRs into a contiguous linear storage space based on a memory logical address after the plurality of PMRs are mapped, and use the contiguous linear storage space as a first storage space configured to process the non-block size aligned read/write request.

Based on the foregoing embodiments, as an optional implementation, the second creation module 702 may be configured to: create an SLC or an MLC configured to process the first block size aligned read/write request.

Based on the foregoing embodiments, as an optional implementation, the third creation module 703 may be configured to create a TLC, or a QLC, or a PLC configured to process the second block size aligned read/write request.

A data processing apparatus according to this embodiment of the present application is described below. The data processing apparatus described below and the data processing method described above may refer to each other.

Figure 8:
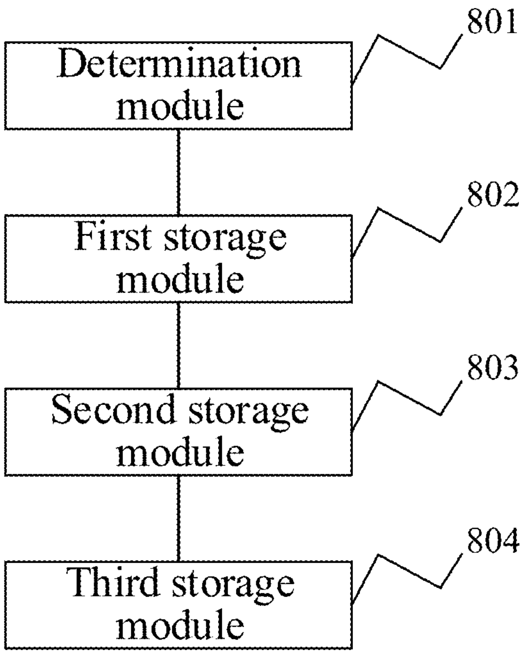
FIG. 8 is a structural diagram of a data processing apparatus according to an exemplary embodiment.

Refer to FIG. 8, which is a structural diagram of a data processing apparatus according to an exemplary embodiment. As shown in FIG. 8, the data processing apparatus includes:

- a determination module 801, configured to determine an alignment mode of the read/write request when receiving a read/write request;
- a first storage module 802, configured to respond to the read/write request by using a first storage space of a storage system in a case that the read/write request is non-block size aligned, wherein the storage system may be the storage system according to the foregoing embodiments;

a second storage module 803, configured to respond to the read/write request by using a second storage space of the storage system in a case that the read/write request is a first block size aligned read/write request; and a third storage module 804, configured to respond to the read/write request by using a third storage space of the storage system in a case that the read/write request is a second block size aligned read/write request, wherein the second block size is greater than the first block size.

In this embodiment of the present application, different storage spaces process different I/O types of data according to characteristics of different flash memories, so as to establish a high-performance, high-cost performance, and high-reliability all-flash storage system. In addition, in this embodiment of the present application, the PMRs in the plurality of storage devices are aggregated into the first storage space for use, which eliminates a read-modify-write process, and improves read and write performance of a small I/O.

Based on the foregoing embodiments, as an optional implementation, the data processing apparatus further includes:

a first migration module, configured to aggregate data of a plurality of bytes in the first storage space to data of the first block size and migrate the data to second storage space.

Based on the foregoing embodiments, as an optional implementation, the data processing apparatus further includes:

a second migration module, configured to aggregate a plurality of pieces of data of the first block size in the second storage space into data of the second block size and migrate the data to the third storage space.

For the apparatus in the foregoing embodiments, optional manners for each module to perform operations have been described in detail in the embodiments related to the method. This will not be described in detail herein.

Figure 9:
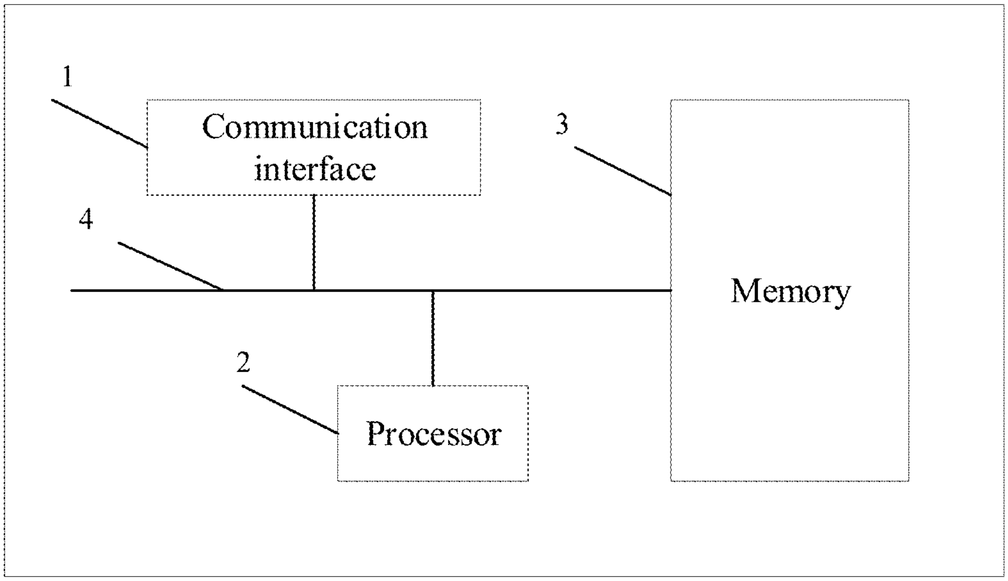
FIG. 9 is a structural diagram of an electronic device according to an exemplary embodiment.

Based on a hardware implementation of the foregoing program module, to implement the method according to the embodiments of the present application, the embodiments of the present application further provide an electronic device. FIG. 9 is a structural diagram of an electronic device according to an exemplary embodiment. As shown in FIG. 9, the electronic device includes:

a communication interface 1, which can perform information interaction with another device, for example, a network device; and a processor 2, connected to the communication interface 1 to achieve information interaction with another device, and configured to perform, when running a computer program, a creation method for a storage system or a data processing method according to one or more technical solutions described above. The computer program is stored in a memory 3.

Certainly, in an actual application, various components in the electronic device are coupled together through a bus system 4. It may be understood that the bus system 4 is configured to implement connection and communication between these components. In addition to a data bus, the bus system 4 further includes a power bus, a control bus, and a state signal bus. However, for clarity of description, various buses are marked as the bus system 4 in FIG. 9.

The memory 3 in this embodiment of the present application is configured to store various types of data to support an operation of the electronic device. Examples of these data include: any computer program operated on the electronic device.

It may be understood that the memory 3 may refer a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disk, a compact disk, or a compact disk read-only memory (CD-ROM). The magnetic surface memory may be either a magnetic disk memory or magnetic tape memory. The volatile memory may be a random access memory (RAM), which is used as an external cache. By way of example but not restrictive description, many forms of RAMs may be used, for example, a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a SyncLink dynamic random access memory (SLDRAM), and a direct rambus random access memory (DRRAM). The memory 3 in the described embodiments of the present application is intended to include, but is not limited to, these and any other suitable types of memories.

The foregoing method disclosed in the embodiments of the present application may be applied to the processor 2, or implemented by the processor 2. The processor 2 may be an integrated circuit chip, and has a signal processing capability. During implementing, various steps of the foregoing method may be completed by an integrated logic circuit in a hardware form or instructions in a software form in the processor 2. The foregoing processor 2 may be a general-purpose processor, a digital signal processor (DSP), or another programmable logic device, a discrete gate, or a transistor logic device, a discrete hardware component, or the like. The processor 2 may implement or perform various methods, steps, and logic block diagrams disclosed in the embodiments of the present application. The general-purpose processor may be a microprocessor, or any conventional processor or the like. Steps of the method disclosed with reference to the embodiments of the present application may be directly performed and completed by using a hardware decoding processor, or may be performed and completed by using a combination of hardware and software modules in the decoding processor. The software module may be located in a storage medium. The storage medium is located in the memory 3. The processor 2 reads a program in the memory 3 and completes steps of the foregoing method with reference to hardware.

The processor 2 implements corresponding processes in various methods of the embodiments of the present application when executing the program. Repetition is omitted here for simplicity.

In an exemplary embodiment, this embodiment of the present application further provides a non-volatile computer-readable storage medium, that is, a computer storage medium. The non-volatile computer-readable storage medium may include a memory 3 for storing a computer program. The foregoing computer program may be performed by the processor 2 to complete steps of the foregoing method. The non-volatile readable storage medium may be a memory such as an FRAM, a ROM, a PROM, an EPROM, an EEPROM, a flash memory, a magnetic surface memory, an optical disk, and a CD-ROM.

It can be understood by those of ordinary skill in the art that all or part steps in the foregoing method embodiments may be implemented by a program to instruct related hardware. The foregoing program may be stored in a non-volatile computer-readable storage medium, and performs steps of the foregoing method embodiments when executing the program. The foregoing non-volatile readable storage medium includes various media that may store program code, such as a mobile storage device, a ROM, a RAM, a magnetic disk, or a CD.

Alternatively, the foregoing integrated units of the present application may be stored in a non-volatile computer-readable storage medium when implemented in a form of a software functional module and sold or used as an independent product. Based on such understanding, a technical solution of this embodiment of the present application or a part contributing to the related technology may be manifested in a form of a software product. The computer software product is stored in a storage medium, and includes a plurality of instructions to enable an electronic device (which may be a personal computer, a server, a network device, and the like) to execute all or part of the methods in various embodiments of the present application. The foregoing storage medium includes various media that may store program code, such as a mobile storage device, a ROM, a RAM, a magnetic disk, or a CD.

The foregoing is merely optional embodiments of this application. The scope of protection of this application is not limited hereto. Any variations or substitutions that may occur to those skilled in the art within the technical scope disclosed in this application shall be encompassed within the scope of protection of this application. Therefore, the scope of protection of this application shall be subject to the scope of protection of the claims.

The invention claimed is:

1. A storage system, wherein the storage system is an all-flash storage system, and the storage system comprises:

a first storage space, configured to process a non-block size aligned read/write request, wherein the first storage space is a storage space comprising persistent memory regions (PMRs) of a plurality of storage devices; and the persistent memory regions are storage regions created by using a persistent memory region function of the plurality of storage devices, the persistent memory regions of the plurality of storage devices are respectively mapped to a memory address space of an operating system, and after mapping, the persistent memory regions are concatenated into a contiguous linear storage space based on memory logical addresses thereof, and the contiguous linear storage space serves as the first storage space configured to process the non-block size aligned read/write request;

a second storage space connected to the first storage space, configured to process a first block size aligned read/write request; and a third storage space connected to the second storage space, configured to process a second block size aligned read/write request, wherein the second block size is greater than the first block size;

wherein the first storage space, the second storage space, and the third storage space are implemented on different flash memories; and the first storage space is further configured to aggregate data of a plurality of bytes into data of the first block size and migrate the data to the second storage space; and the second storage space is further configured to aggregate a plurality of pieces of data of the first block size into data of the second block size and migrate the data to the third storage space.

2. The storage system according to claim 1, wherein the first storage space is a storage space of a storage-class memory.

3. The storage system according to claim 1, wherein the storage device are solid-state drives.

4. The storage system according to claim 1, wherein the second storage space is a single level cell (SLC) or a multi level cell (MLC).

5. The storage system according to claim 1, wherein the third storage space is a triple level cell (TLC), or a quad level cell (QLC), or a penta level cell (PLC).

6. The storage system according to claim 1, wherein the first storage space is configured to store byte-scale data;

the second storage space is configured to store KB-scale data; and the third storage space is configured to store MB-scale data.

7. The storage system according to claim 1, wherein the first storage space, the second storage space, and the third storage space are implemented on different flash memories.

8. A creation method for a storage system, wherein the storage system is an all-flash storage system, and the method comprises:

mapping persistent memory regions (PMRs) of a plurality of storage devices to a memory address space of an operating system, respectively, to create a first storage space configured to process a non-block size aligned read/write request; wherein the persistent memory regions are storage regions created by using a persistent memory region function of the plurality of storage devices;

creating a second storage space configured to process a first block size aligned read/write request; and creating a third storage space configured to process a second block size aligned read/write request, wherein the second block size is greater than the first block size;

wherein the creating the first storage space configured to process the non-block size aligned read/write request comprises:

concatenating the plurality of persistent memory regions into a contiguous linear storage space based on memory logical addresses after the persistent memory regions are mapped, and using the contiguous linear storage space as the first storage space configured to process the non-block size aligned read/write request; and wherein the first storage space, the second storage space, and the third storage space are implemented on different flash memories; and the first storage space is further configured to aggregate data of a plurality of bytes into data of the first block size and migrate the data to the second storage space; and the second storage space is further configured to aggregate a plurality of pieces of data of the first block size into data of the second block size and migrate the data to the third storage space.

9. The creation method for a storage system according to claim 8, wherein the creating the second storage space configured to process the first block size aligned read/write request comprises:

creating a single level cell or a multi level cell configured to process the read/write request that is aligned with the first block size.

10. The creation method for a storage system according to claim 8, wherein the creating the third storage space configured to process the second block size aligned read/write request comprises:

creating a triple level cell (TLC), or a quad level cell (QLC), or a penta level cell (PLC) configured to process the second block size aligned read/write request.

11. The creation method for a storage system according to claim 8, wherein the first storage space, the second storage space, and the third storage space are implemented on different flash memories.

12. A data processing method, comprising:

in response to receiving a read/write request, determining an alignment mode of the read/write request;

responding to the read/write request by using a first storage space of a storage system in a case that the read/write request is a non-block size aligned read/write request, wherein the storage system is an all-flash storage system, the first storage space is a contiguous linear storage space comprising persistent memory regions (PMRs) of a plurality of storage devices, and the persistent memory regions are storage regions created by using a persistent memory region function of the plurality of storage devices;

responding to the read/write request by using a second storage space of the storage system in a case that the read/write request is a first block size aligned read/write request; and responding to the read/write request by using a third storage space of the storage system in a case that the read/write request is second block size aligned read/write request, wherein the second block size is greater than the first block size;

wherein the first storage space, the second storage space, and the third storage space are implemented on different flash memories; and the first storage space is further configured to aggregate data of a plurality of bytes into data of the first block size and migrate the data to the second storage space; and the second storage space is further configured to aggregate a plurality of pieces of data of the first block size into data of the second block size and migrate the data to the third storage space.

13. The data processing method according to claim 12, further comprising:

aggregating data of a plurality of bytes in the first storage space into data of the first block size and migrating the data to the second storage space.

14. The data processing method according to claim 12, further comprising:

aggregating a plurality of pieces of data of the first block size in the second storage space into data of the second block size and migrating the data to the third storage space.

15. The data processing method according to claim 12, wherein the first storage space, the second storage space, and the third storage space are implemented on different flash memories.

* * * * *